United States Patent [19]

Abdul

[11] Patent Number: 4,746,530
[45] Date of Patent: May 24, 1988

[54] MAKING A NATURAL FOOD PEANUT PUNCH

[76] Inventor: Abadan J. Abdul, 3850 Finch Ave. E., Suite 207A, Agincourt, Ontario, Canada

[21] Appl. No.: 61,808

[22] Filed: Jun. 15, 1987

[51] Int. Cl.$^4$ ............... A23C 9/154; A23C 9/156; A23L 1/20
[52] U.S. Cl. .................................. 426/580; 426/598
[58] Field of Search ............... 426/590, 598, 633, 580

[56] References Cited

U.S. PATENT DOCUMENTS

| | | | |
|---|---|---|---|
| 1,210,667 | 1/1917 | Melhuish | 426/598 |
| 4,025,658 | 5/1977 | Pominski et al. | 426/598 |
| 4,639,374 | 1/1987 | Matsunobu et al. | 426/598 |

*Primary Examiner*—Raymond N. Jones
*Assistant Examiner*—Mary S. Mims

[57] ABSTRACT

The present invention relates to a method and ingredients for making a natural food peanut punch. The ingredients comprise liquid skim milk, sugar, stabilizer, peanut butter and liquid caramel, all in varying amounts with the sugar and stabilizer first being preblended and then added to the skim milk heated to about 72° C., and the peanut butter and liquid caramel then added while maintaining the 72° C. temperature with continuous agitation for about 10 minutes.

4 Claims, No Drawings

MAKING A NATURAL FOOD PEANUT PUNCH

FIELD OF THE INVENTION

The present invention relates to a natural food peanut punch.

BACKGROUND OF THE INVENTION

Peanut punch is a beverage which is well known and popular in the West Indies Islands. However, to date there has been nothing in the way of a standard formula for or method of making peanut punch, particularly one that would be suitable for industry production. Also anything that is presently available in the way of peanut punch, is made with synthetic ingredients and does not have the food value of natural ingredients which has and continues to come to the forefront over the last few years.

SUMMARY OF THE PRESENT INVENTION

The present invention provides a peanut based punch beverage formed from greater than 80% liquid skim milk by weight, less than 10% sugar and stabilizer and less than 10% peanut butter and liquid caramel. The actual procedure of mixing the ingredients comprises preblending the sugar and stabilizer and then slowly adding to the skim milk under agitation at a medium speed of for example 200 to 300 r.p.m.s. for about 5 minutes. The mixture which is formed is then heated to about 72° C. while slowly adding the peanut butter and liquid caramel maintaining the medium speed agitation and holding the 72° C. temperature for about 10 minutes.

Once the peanut punch has been formed as above, it is ultra heat treated according to a particular aspect of the present invention and then further aseptically packaged for marketing purposes.

DETAILED DESCRIPTION ACCORDING TO THE PREFERRED EMBODIMENTS OF THE PRESENT INVENTION

A batch of peanut butter punch was made using the following formula:

| INGREDIENT | SUPPLIER | PERCENTAGE BY WEIGHT |
|---|---|---|
| Part A | | |
| Liquid Skim Milk | | 85.41 |
| Part B | | |
| Sugar, Fine | Lantic Sugar | 6.50 |
| Stabilizer, eg Carageenan (Seakem CM 611) | FMC Corporation Marine Colloids Division | 0.04 |
| Part C | | |
| Peanut Butter (Natural, Smooth) | Bowes Co. Ltd. | 8.0 |
| Liquid Caramel (Sethness BC 145) | Food Ingredients | 0.05 |
| | | 100.00 |

The actual procedure producing the formula is as follows:

(1) Preblend Part B ingredients;
(2) Slowly add Part B to skim milk. Agitate at medium speed, eg 200 to 300 r.p.m. for about 5 minutes.
(3) Heat to 72±1° C. Slowly add Part C maintaining agitation. Hold at 72±1° C. for 10 minutes with continuous agitation at medium speed.

After completing steps 1 through 3 above, the formula is then ultra heat treated under the following conditions:

| (4) Heating Temperature | 141 ± 1° C. |
|---|---|
| Holding Time | 3-4 seconds |
| Homogenization Pressure (single stage) | 1800 psi |
| Homogenization Temperature | 65 ± 5° C. |

The product is then packaged aseptically at a temperature of about 18° C.±2° C. for a shelf life at room temperature of up to six (6) months.

At the ultra heat treatment stage and in accordance with the particular ultra heat treatment (UHT) unit used, it is important that the peanut butter be finally dispersed in the milk before passing through the UHT unit to avoid blockage in the homogenizer. Depending on the plant facility, it may be necessary to blend the peanut butter partially with the milk before adding to the full batch.

Although preferred embodiments of the invention have been described, it will be appreciated that variations may be made without departing from the spirit of the invention or the scope of the appended claims.

The embodiments of the invention in which an exclusive property or privilege is claimed are defined as follows:

1. A method of making a peanut based punch beverage formed from ingredients;
   (A) liquid skim milk over 80% by weight;
   (B) fine sugar under 10% by weight; stabilizer under 1% by weight;
   (C) peanut butter under 10% by weight; liquid caramel under 1% by weight;
said method comprising the steps of;
   (1) preblending ingredients (B);
   (2) adding preblended ingredients (B) to ingredients (A) and agitate at medium speed for about 5 minutes to form a mixture of ingredients (A) and (B);
   (3) heating the mixture of step (2) to about 72° C. and adding ingredients (C) during agitation to form a mixture of ingredients (A), (B) and (C) while maintaining a temperature at about 72° C. with continuous agitation at medium speed for about 10 minutes.

2. A method of making a peanut based punch beverage as claimed in claim 1, including further ultra heat treatment comprising heating the mixture of step 3 above to a temperature of about 141° C. for a period of about 3 to 4 seconds and then lowering to a homogenization temperature of about 60° to 70° C. at a homogenization pressure of about 1800 psi.

3. A method of making a peanut based punch beverage as claimed in claim 2, comprising further aseptically packaging at a temperature of about 16° to 20° C.

4. A method of making a peanut based punch beverage as claimed in claim 1, in which the liquid skim milk forms 85.41%, the fine sugar forms 6.50%, the stabilizer forms 0.04%, the peanut butter forms 8.0% and the liquid caramel forms 0.05% by weight of the punch beverage.

* * * * *